Patented Aug. 5, 1930

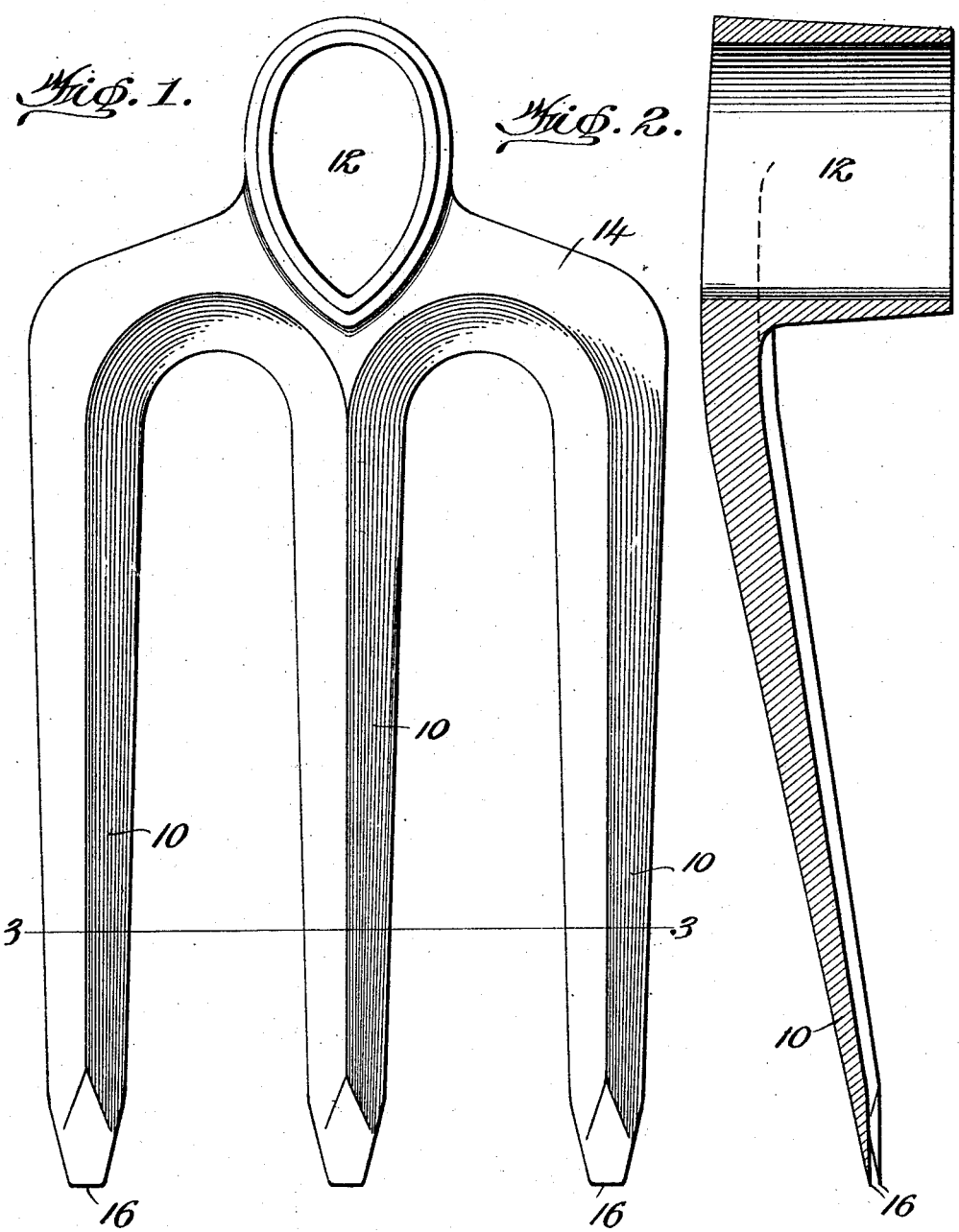

1,772,385

UNITED STATES PATENT OFFICE

DOMENICO D'AMBROSIO, OF MARSHFIELD, OREGON

GRUBBING FORK

Application filed November 9, 1926. Serial No. 147,289.

My invention relates to improvements in grubbing forks and my purposes are to provide a grubbing fork in which the weight thereof is so distributed as to give maximum penetrating effect to a blow delivered thereby, and to so form and shape the tines thereof as to render them strong and capable of use for prying purposes without liability of breakage thereof.

With the foregoing and other purposes in view, my invention consists in the novel features of construction, combination and arrangement of parts as will be hereinafter more fully described, illustrated in the accompanying drawings and defined in the appended claim.

In the drawings, wherein like characters of reference denote corresponding parts in the different views:—

Fig. 1 is a rear elevation of a grubbing fork constructed in accordance with my invention;

Fig. 2, a central vertical section through the fork; and

Fig. 3, a transverse section through the tines thereof, taken approximately on the line 3—3 of Fig. 1.

Referring to the drawings in detail, it will be observed that my improved grubbing fork includes, as usual, a plurality of tines 10, three in this instance, and an eye or socket 12 for the reception of a handle, the tines being connected with said eye or socket through the instrumentality of a body portion 14 formed integrally with the eye and tines.

The tines 10 are inclined inwardly with respect to the axis of eye 12 at an angle of approximately twelve degrees, so that when the fork is swung to drive said tines into the soil they will enter the soil without substantially greater pressure against the soil to one side of the tines than the other. In other words, such angular disposition of the tines with respect to the axis of the eye 12 serves the purpose of eliminating glancing blows of the tines against the soil when the fork is swung in the ordinary manner to sink the tines into the soil, and eliminates the necessity of the user of the fork exercising more than ordinary care in its manipulation to avoid glancing blows.

The outer face of each tine 10 is straight in the direction of its length, but the tines, considered collectively, are disposed with their outer straight faces in a convex curve transversely of the fork, this being due to the body portion 14 being arched or transversely curved to add strength thereto whereby the fork is rendered capable of withstanding relatively severe bending strains when it is used for prying purposes.

In order further to increase the strength and durability of my fork, particularly the tines thereof, the latter are gradually increased in thickness from their lower sharpened penetrating ends 16 towards their upper ends where they join the body portion 14, and said body portion is relatively thick so as to locate the principal amount of the weight of the fork near the top thereof where it will most effectively serve to urge the tines into the ground when the fork is swung in the usual manner to accomplish this purpose.

The tines 10 moreover are formed of triangular shape in cross section to render them of maximum individual strength, the outer face of each tine comprising one of the flat triangular faces thereof and the inner face of each tine as a consequence sloping from the center thereof towards its side edges, this construction serving in conjunction with the generally tapered form of the tines to provide strength to resist bending strains to which the tines are subjected when the fork is used for prying purposes.

The cutting edges 16 at the lower ends of the tines 10 are formed by bevelling the inner faces of the tines so as further to eliminate any tendency of the tines to strike glancing blows.

From the foregoing description considered in connection with the accompanying drawings, it is believed that the construction and advantages of my improved grubbing fork will be clearly understood and appreciated. I desire to point out, however, that various minor departures from the illustration in the drawing may be resorted to within the spirit and scope of my invention as defined in the appended claim.

I claim:

A grubbing fork including an eye for the reception of a handle and tines formed integrally with said eye, said tines being of triangular shape in cross section with substantially flat faces thereof disposed outermost and arranged in a curve transversely of the fork, the outer faces of said tines throughout a major portion of their length being straight and disposed at an angle of approximately twelve degrees to the longitudinal axis of said eye and being joined with said eye by a curved portion forming a rolling fulcrum for the fork when it is used for prying purposes.

In testimony whereof I hereunto affix my signature.

DOMENICO D'AMBROSIO.